Dec. 25, 1962 A. R. FJERMESTAD 3,070,067
SUCTION LINE CONNECTOR FOR MILKING MACHINE CLAWS
Filed Feb. 2, 1961
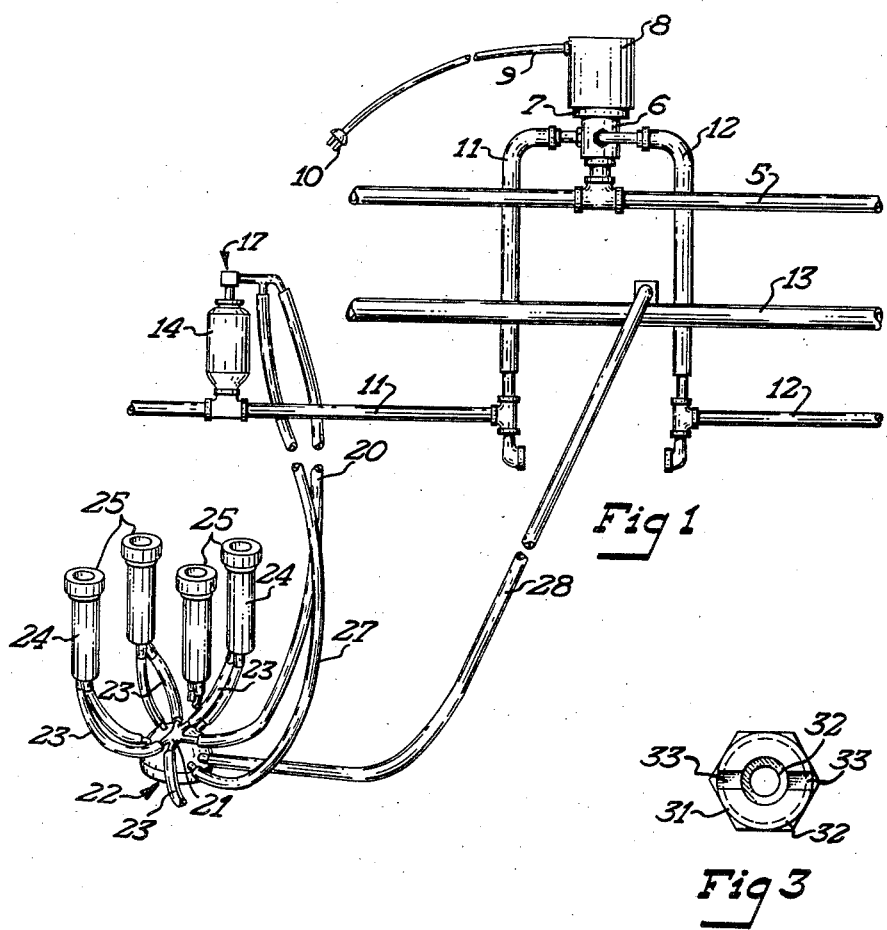
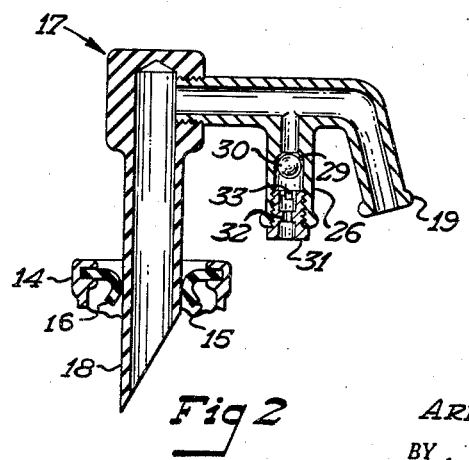
INVENTOR.
ARNOLD R. FJERMESTAD
BY
Everett G. Schroeder
ATTORNEY 3,070,067
SUCTION LINE CONNECTOR FOR MILKING
MACHINE CLAWS
Arnold R. Fjermestad, Albert Lea, Minn., assignor to National Cooperatives, Inc., Albert Lea, Minn., a corporation of the District of Columbia
Filed Feb. 2, 1961, Ser. No. 86,768
11 Claims. (Cl. 119—14.36)

This invention relates to milking machine apparatus. More particularly, it relates to milking machine claw assemblies and means for uniquely and simultaneously connecting a plurality of the same with a single source of alternating free air and suction.

In the milking machine apparatus it has been suggested previously to utilize a single master pulsator in lieu of a separate pulsator for each claw assembly. To the best of my knowledge, however, this has never proved practical so that it is standard practice today to use a separate pulsator in controlling relation with each claw assembly. This, however, is expensive, inconvenient, and laborious. Recently, however, I have designed a master pulsator and system (as disclosed and claimed in another of my patent applications co-pending herewith) which makes the use of the latter practical to the end that a single pulsator will perform the desired functions for a plurality of branch lines and an associated plurality of milking claw assemblies while obviating the need for individual pulsators for each claw assembly. Such branch lines have alternately suction and free air applied thereto by way of the master pulsator. With the advent of a satisfactory master pulsator comes the need for a simple and effective means of connecting the individual claw assembly at positions selected at will along the length of the branch lines.

The problem, of course, could be solved in a number of different ways but I have conceived a novel connector means which provides some distinct advantages as will be shown below. In particular, in addition to performing the primary function of connecting the source of alternate suction and free air to the interior of the claw assembly shells and the exterior of the inflation, my connector includes automatic means for connecting the free air to the milk line of the claw assembly at an advantageous time while preventing the application thereto of suction of the branch suction line which is normally greater than that of the milk line.

It is a general object of my invention to provide a novel and improved connector means for connecting a claw assembly to a source of alternate suction and free air.

A more specific object is to provide a novel and improved milking apparatus assembly which provides a simple and inexpensive means of quickly and easily connecting a plurality of individual milking claw assemblies to a source of alternating suction and free air in a novel manner such as to provide distinct advantages over other means of connection to the same and over systems heretofore known.

Another object is to provide a novel and improved connector means uniquely designed and constructed to quickly, easily, and inexpensively connect a milking claw assembly to a source of alternate suction and free air in such a manner as to effectively connect the interior of the shell with the source and simultaneously and automatically connect the milk line of the claw assembly with the free air of the source while preventing connection of the milk line with the suction of that source.

Another object is to provide novel and improved connector means of simple and inexpensive construction and operation which readily permits a number of individual claw assemblies to be connected to a source of alternating suction and free air in such a manner as to obviate the need for individual pulsators for each of the claw assemblies.

These and other objects and advantages of my invention will more fully appear from the following description, made in connection with the accompanying drawings, wherein like reference characters refer to the same or similar parts throughout the several views, and in which:

FIG. 1 is a perspective view of a claw assembly connected with my connector means to an alternating source of suction and free atmosphere as provided by my master pulsator.

FIG. 2 is a vertical sectional view on an enlarged scale taken through my connector means.

FIG. 3 is a top plan view of the slotted retainer screw portion of the valve element.

One embodiment of my invention as shown in FIGS. 1–2 includes a main suction line 5 which is conventional and is normally connected to the vacuum pump (not shown). As shown in FIG. 1 a master pulsator 6 is connected in fluid communication with the main suction line 5 and is driven through gear reducing mechanism 7 by a motor 8 which is provided with an electrical line 9 having a plug 10 at the outer end thereof for connection to a source of electricity. The master pulsator 6 is connected at 90 degree angles to branch lines 11 and 12. Through the action of the master pulsator 6 these branch lines become sources of alternate suction and free atmosphere with the atmosphere being present in one when the suction is applied to the other and vice versa. In this manner a single vacuum pump can be utilized over a much greater area and operated from a remote location.

Only one claw assembly has been shown connected to one of the branch lines 11 and 12 for the sake of simplifying the description. There is shown in FIG. 2 the milk line 13 which is under a constant suction of approximately 13.5 inches in contrast to the suction applied to the branch lines which is ordinarily approximately 15 inches. The use of the milk line 13 under constant suction for the purpose of removing the milk from the claw assembly and transporting it to a remote location such as a bulk receiver tank is standard practice and has been shown in order to better illustrate the exact manner in which the invention is utilized. Mounted on the branch line 11 is an upstanding cylindrical member 14 which is preferably formed of rubber and has a hollow interior in communication with the interior of the branch line 11. As best shown in FIG. 2, this cylindrical member 14 has a slitted upper surface with a pair of lips 16 and 15 which can be forced apart when desired and which, when in normal position close off the opening at the top of the member 14 to prevent loss of suction when the same is applied to the branch conduit 11. The socket member 14 constitutes a simple means for connecting my suction line connector to the branch line 11.

My connector, as shown in FIG. 2 is comprised of a main conduit 17 which has one end 18 thereof adapted to be quickly and easily inserted into the socket member 14 to part the lips 15 and 16 and connect the interior of the conduit 17 with the interior of the branch conduit 11 in fluid communication. As best shown in FIG. 2, the opposite end 19 of the conduit 17 is adapted to have a flexible tube 20 slid thereon to connect the same with the T 21 of the claw assembly which is indicated generally by the numeral 22. As is conventional, the T 21 is connected by short tubes 23 to the shells 24 of the claw assembly so as to bring the interior of the branch conduit 11 into fluid communication with the area between the shells 24 and their respective inflations 25. Reference to FIG. 2 will show that in this manner the interior of the branch conduit 11 is always in fluid communication with the area between the inflations and their surrounding shells 24.

The rigid conduit 17, as clearly shown in FIG. 2 is provided with a branch conduit 26 which extends laterally from the main conduit and is adapted at its outer end to be connected to a hose 27 which leads to the claw 22 and is connected in fluid communication with the interior thereof to thereby bring the interior of the hose 27 in fluid communication with the individual milk line 28 of the claw assembly.

The branch conduit 26 is provided with valve means therewithin in order to automatically connect the interior of the claw 22 with the source of alternating suction and free atmosphere when free air is supplied by that source and to automatically cut off the interior of the claw from that source when suction is supplied thereby. This valve means includes a valve seat 29 and a round metal ball 30 disposed immediately therebelow and retained in relatively close proximity to the seat by means of a slotted retainer screw 31. This retainer screw 31 is threaded into the outer end of the branch conduit 26 which is internally threaded for that purpose and can be best seen in FIG. 2.

The slotted retainer screw 31 is tubular in form and has a reduced bore of approximately 5/64 inch diameter. This reduced bore is indicated by the numeral 32. The upper end of the retainer screw 31 is slotted transversely to provide a transverse air passage 33 which is one-sixteenth inch wide and one-sixteenth inch deep. This passage 33 extends transversely across the entire upper end of the retainer screw 31 so that when the ball 30 rests upon the upper end of the element 31, the passage of air through the retainer element 31 is controlled by the diameter of the reduced bore 32 since air can readily pass around the lower surface of the ball through the passage 33.

Reference to FIG. 1 will quickly show the adaptability of my connector and the ease with which one or a plurality of separate claw assemblies 22 may be quickly connected to a branch conduit such as the branch line 11. To accomplish this the connector 17 is merely slipped into the upper end of the element 14 and the tube 20 of the claw assembly is slid onto the end 19 while the tube 27 is slid onto the branch conduit 26. This immediately brings the claw assembly 22 in fluid communication with the interior of the source of alternate suction and free air which is provided to the branch conduit by the master pulsator 6. When suction is applied to the conduit 11, this suction is transmitted through the tube 20 to the T 21 to cause the inflations 25 to be expanded and permit the milking operation to take place by means of the suction which is applied through the tube 28 and the milk line 13. As suction is applied to the conduit 17 the ball 30 is drawn upwardly against the seat 29 to effectively close off the branch line 26 and prevent the greater suction from being applied to the tube 27. Since the suction which is applied through the branch conduit 11 is approximately 15 inches, the valve means prevents this greater suction from being applied to the interior of the claw assembly 22. As soon as air is provided to the interior of the branch line 11, however, the ball automatically drops through the effect of gravity and suction transmitted through conduit 27 from claw 22 and rests upon the upper surface of the retainer screw 31. This permits air to rush into the branch conduit 26, through the air passage 33 and the reduced bore 32 into the tube 27 and into the interior of the claw to facilitate the movement of the milk through the tube 28 into the milk line 13. This admittance of air also decreases the amount of vacuum around the teats of the cow when the inflations 25 are collapsing during the massage action. Thus it will be noted that the entrance of air is timed so as to enter the claw during the collapsed cycle of the inflation. This forces the milk already in the claw out of the claw and up the milk line 28 and also somewhat reduces the suction applied to the teat during the brief period of relaxation.

It will be noted that through the system described above the air is introduced into the milk handling apparatus at an elevated position which is in a non-contaminated area and hence is substantially more sanitary than other systems such as where air is constantly introduced into the interior of the claw by means of an opening therein. Because of the elevated position of the introduction of air at the master pulsator 6, herein a source of contamination which frequently exists at lower levels is not present.

The slotted retainer screw 31 is provided in order to facilitate cleansing of the reduced bore. In this connection it should be noted that the amount of air which is permitted to enter the claw at any one time cannot be excessive for the simple reason that it would destroy the suction which is constantly applied through the milk line 13. On the other hand it must be sufficient to cause the milk to move upwardly 8–9 feet in pipe line milkers where the line is elevated, conventionally, relative to the claw assembly. The reduced bore 32 is of such a diameter as to provide an optimum amount of air within the interior of the claw 22. Because the slotted retainer screw 31 is threaded into the end of the branch conduit 26, it can be easily removed for cleansing. This is in preference to utilization of a relatively small valve seat for such a valve seat is very difficult to clean.

It should also be noted that through the use of my connector we introduce air simultaneously into the T 21 of the claw and the milk line 28. Heretofore it has been common to introduce the air into the milk line when the suction was applied to the T and vice versa.

From the above it can be seen that I have provided a very simple, inexpensive and practical as well as efficient means of connecting any desired number of claw assemblies 22 to a source of alternate suction and free atmosphere to provide an improved milking performance and sanitation conditions. It will be readily appreciated that this connector can be manufactured very inexpensively and that its use greatly facilitates connection of the individual claw assemblies to the branch conduit 11. Through its use in combination with the master pulsator, it is no longer necessary to utilize an individual pulsator with each claw assembly.

It will, of course, be understood that various changes may be made in the form, details, arrangement and proportions of the parts without departing from the scope of my invention which consists of the matter shown and described herein and set forth in the appended claims.

What is claimed is:

1. In milking machine apparatus, a milking machine claw assembly including at least one inflation and a shell surrounding the same, a milk line under constant suction connected in fluid communication with said claw assembly for drawing the milk away therefrom and from said inflation to a remote location, a source of alternating greater suction and free atmosphere, a conduit connecting in fluid communication said source of greater suction and free atmosphere with the interior of said shell exteriorly of said inflation, a second conduit extending between said source of greater suction and free atmosphere and said milk line, and valve means interposed within said second conduit and opening only when said source provides free atmosphere to thereby cause a restricted flow of free air to enter said milk line at that time in order to facilitate the flow of milk through said milk line.

2. The structure defined in claim 1 wherein said valve means is actuated to closed position by the suction applied to said second conduit by said source of alternating greater suction and free atmosphere.

3. The structure defined in claim 1 wherein said valve means is gravity actuated to open position and is moved to closed position by only the suction applied to said second conduit by said source.

4. The structure defined in claim 1 wherein said valve means includes a valve seat and a ball-like member disposed immediately therebelow, said ball-like member being moved to open position by gravity only when free air is provided to said second conduit by said source and being moved to closed position against said seat automatically by suction when the latter is applied to said second conduit by said source.

5. In milking machine apparatus, a milking machine claw assembly including at least one inflation and a shell surrounding the same, a milk line under constant suction connected in fluid communication with said claw assembly for drawing the milk away therefrom and from said inflation to a remote location, a source of alternating greater suction and atmospheric air pressure, conduit means connecting said source of alternating greater suction and air in fluid communication with the shell of said claw assembly and extending between said milk line and said source of alternating greater suction and air, and valve means interposed within the portion of said conduit means leading to said milk line and opening only when said source provides free air to thereby cause a restricted flow of free air to enter said milk line at that time in order to facilitate the flow of milk through said milk line.

6. The structure defined in claim 5 wherein said valve means includes a valve element constantly urged toward open position by gravity and being drawn automatically to closed position by the suction applied by said source.

7. In milking machine apparatus, a milking machine claw assembly, a milk line under constant suction connected with said claw assembly for drawing the milk away therefrom to a remote location, a source of alternating greater suction and atmospheric air pressure, conduit means extending between said milk line and said source of alternating suction and atmospheric pressure, and valve means interposed within said conduit means and opening only when said source provides free air to permit a restricted flow of free air to enter said milk line at that time in order to facilitate the flow of milk through said milk line.

8. In a milking machine apparatus, a claw assembly having a milk-collecting chamber therein and being adapted to have said chamber connected to a suction-type milk withdrawing tube; means connected to said assembly for engaging the teats of a cow and intermittently drawing milk therefrom and introducing the same into said chamber, said means including at least one shell and a teat inflation therewithin, means connected to said shell for alternately applying suction and introducing air into the area between said inflation and said shell; and mechanism connected with said last mentioned means for introducing air into the interior of said chamber simultaneously with the introduction of air into the area between said inflation and said shell and for shutting off such air upon the application of suction to the area between said shell and said inflation.

9. A connector for connecting one of a plurality of claw assemblies having inflations and shells surrounding the same to a common source of alternating suction and free air, said connector comprising a rigid main conduit adapted at one of its ends to be readily connected to such a source and at its opposite end to a flexible conduit in fluid communication with the areas between the inflations and shells of the claw assembly, a branch conduit carried by said rigid conduit and extending laterally therefrom in fluid communication therewith and having a free end portion adapted to be connected with a flexible conduit in fluid communication with the interior of the claw, and valve means interposed within said branch conduit, said valve means being automatically controlled by the alternating suction and free air provided by said common source and closing in response to suction within said main conduit and opening in response to free air within said main conduit to thereby cause a restricted flow of free air to enter the claw at that time only in order to facilitate the withdrawal of milk therefrom.

10. The structure defined in claim 9 wherein said valve when so connected is constantly urged toward open position by gravity and suction and is closed only by greater suction when such is present in said main conduit.

11. The structure defined in claim 9 wherein said valve means includes a valve seat and a valve element disposed therebelow, said valve element being comprised of a ball-like member which is drawn to closed position against said seat by suction within said main conduit and is moved by gravity to open position away from said valve seat when free air is within said main conduit.

References Cited in the file of this patent
UNITED STATES PATENTS

| | | |
|---|---|---|
| 2,606,524 | Daily et al. | Aug. 12, 1952 |
| 2,775,955 | Anderson | Jan. 1, 1957 |